(12) United States Patent
Kulesza et al.

(10) Patent No.: US 10,061,834 B1
(45) Date of Patent: Aug. 28, 2018

(54) INCREMENTAL OUT-OF-PLACE UPDATES FOR DATASETS IN DATA STORES

(71) Applicant: Amazon Technologies, Inc., Reno, NV (US)

(72) Inventors: Jakub Kulesza, Bellevue, WA (US); Bharath Kumar Chelepalli, Seattle, WA (US); Deepak Agarwal, Redmond, WA (US); Anurag Windlass Gupta, Atherton, CA (US)

(73) Assignee: Amazon Technologies, Inc., Reno, NV (US)

( * ) Notice: Subject to any disclaimer, the term of this patent is extended or adjusted under 35 U.S.C. 154(b) by 554 days.

(21) Appl. No.: 14/530,495

(22) Filed: Oct. 31, 2014

(51) Int. Cl.
*G06F 17/30* (2006.01)

(52) U.S. Cl.
CPC .. *G06F 17/30592* (2013.01); *G06F 17/30091* (2013.01); *G06F 17/30159* (2013.01); *G06F 17/30197* (2013.01)

(58) Field of Classification Search
CPC ......... G06F 17/30159; G06F 17/30156; G06F 17/310641; G06F 3/067; G06F 17/30312; G06F 17/30067; G06F 17/30327
See application file for complete search history.

(56) References Cited

U.S. PATENT DOCUMENTS

| | | | |
|---|---|---|---|
| 7,647,329 B1 * | 1/2010 | Fischman | G06F 17/30094 707/999.1 |
| 7,792,798 B2 | 9/2010 | Tremaine et al. | |
| 7,984,022 B2 | 7/2011 | Cannon et al. | |
| 8,204,868 B1 * | 6/2012 | Wu | G06F 17/30156 707/693 |
| 8,307,087 B1 * | 11/2012 | Patvarczki | H04L 67/1097 707/827 |
| 8,442,952 B1 * | 5/2013 | Armangau | G06F 17/30159 706/14 |
| 8,452,932 B2 * | 5/2013 | Pangal | G06F 11/1453 711/162 |
| 8,738,577 B1 * | 5/2014 | Gardner | G06F 17/30159 707/640 |
| 8,738,588 B2 | 5/2014 | Cannon et al. | |
| 8,751,768 B2 | 6/2014 | Malige et al. | |
| 8,843,443 B1 * | 9/2014 | Xing | G06F 11/1438 707/639 |

(Continued)

*Primary Examiner* — Rehana Perveen
*Assistant Examiner* — Alp Onat
(74) *Attorney, Agent, or Firm* — Robert C. Kowert; Meyertons Hood Kivlin Kowert & Goetzel, P.C.

(57) ABSTRACT

A data store may implement incremental out-of-place updates to a dataset. A dataset may maintain data across different storage locations linked together according to an ordering schema for servicing queries. As updates to the dataset are received, the updates may be persisted but not maintained in-place. In order to update the data store and maintain the ordering schema, incremental updates to the dataset may be performed without blocking queries directed toward the dataset. The dataset may be divided into multiple data chunks that correspond to different storage locations and an updated version of the data chunk may be generated in new storage locations. The new storage locations may then replace the storage locations of the prior version of the data chunk in order to link the new storage locations to the other linked storage locations in the dataset for servicing queries.

20 Claims, 8 Drawing Sheets

(56) References Cited

U.S. PATENT DOCUMENTS

| | | | | |
|---|---|---|---|---|
| 8,849,777 | B1* | 9/2014 | Xing | G06F 17/30088 707/640 |
| 8,862,588 | B1* | 10/2014 | Gay | G06F 17/30336 707/741 |
| 8,898,114 | B1* | 11/2014 | Feathergill | G06F 17/30159 707/648 |
| 8,990,171 | B2* | 3/2015 | Kalach | G06F 17/30159 707/664 |
| 9,251,160 | B1* | 2/2016 | Wartnick | G06F 17/30159 |
| 2009/0319534 | A1* | 12/2009 | Gokhale | G06F 17/30 |
| 2010/0106691 | A1* | 4/2010 | Preslan | G06F 11/1453 707/674 |
| 2011/0167221 | A1* | 7/2011 | Pangal | G06F 11/1453 711/117 |
| 2012/0158709 | A1* | 6/2012 | Gaonkar | G06F 17/30156 707/723 |
| 2012/0191670 | A1* | 7/2012 | Kennedy | G06F 11/1453 707/692 |
| 2012/0226936 | A1* | 9/2012 | Prabhakaran | G06F 11/1662 714/6.23 |
| 2013/0060739 | A1* | 3/2013 | Kalach | G06F 17/30159 707/692 |
| 2013/0238562 | A1* | 9/2013 | Kumarasamy | G06F 17/30088 707/649 |
| 2013/0339298 | A1* | 12/2013 | Muller | G06F 17/30283 707/640 |
| 2014/0089269 | A1* | 3/2014 | Akirav | G06F 17/30156 707/689 |
| 2014/0324917 | A1 | 10/2014 | Haas et al. | |
| 2015/0026131 | A1 | 1/2015 | Schreter | |
| 2015/0234710 | A1* | 8/2015 | Berrington | G06F 11/1407 707/664 |
| 2016/0078068 | A1* | 3/2016 | Agrawal | G06F 11/14 707/692 |

* cited by examiner

INCREMENTAL OUT-OF-PLACE UPDATES FOR DATASETS IN DATA STORES

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data storage and data management.

Figure 1A:
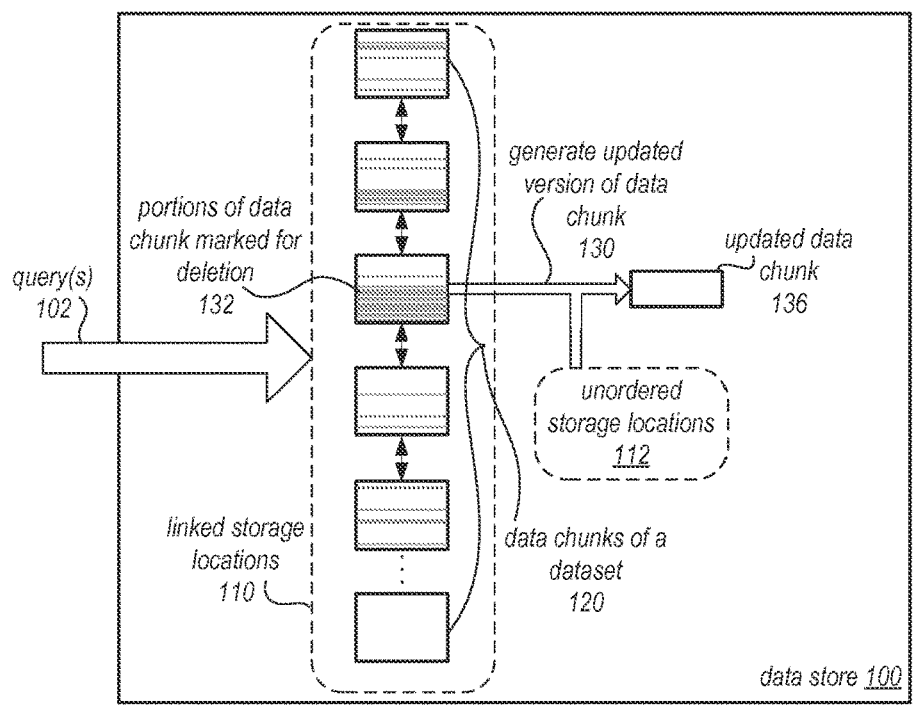
FIGS. 1A and 1B illustrate a series of block diagrams implementing incremental out-of-place updates to datasets for data stores, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

In the following detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments of incremental out-of-place updates to datasets are described herein. Managing data stored in data stores increases in complexity and operational cost as the amount of data stored in the data store increases. In order to provide more efficient access to datasets maintained in a data store for various workloads, such as analytics workloads, the underlying storage of data may be maintained according to a particular ordering schema. Records in a database table, for instance, may be stored in a sorted order according to a particular column value. Storing data according to an ordering schema, however, may require maintenance to keep the data sorted as a result of updates to the data, such as deletions of data or insertions of new data. Thus, in some embodiments, updates to a dataset may not be performed in-place, but instead stored in a separate location and/or applied at a later to reduce the maintenance operations performed for individual update requests to the dataset.

Figure 1B:
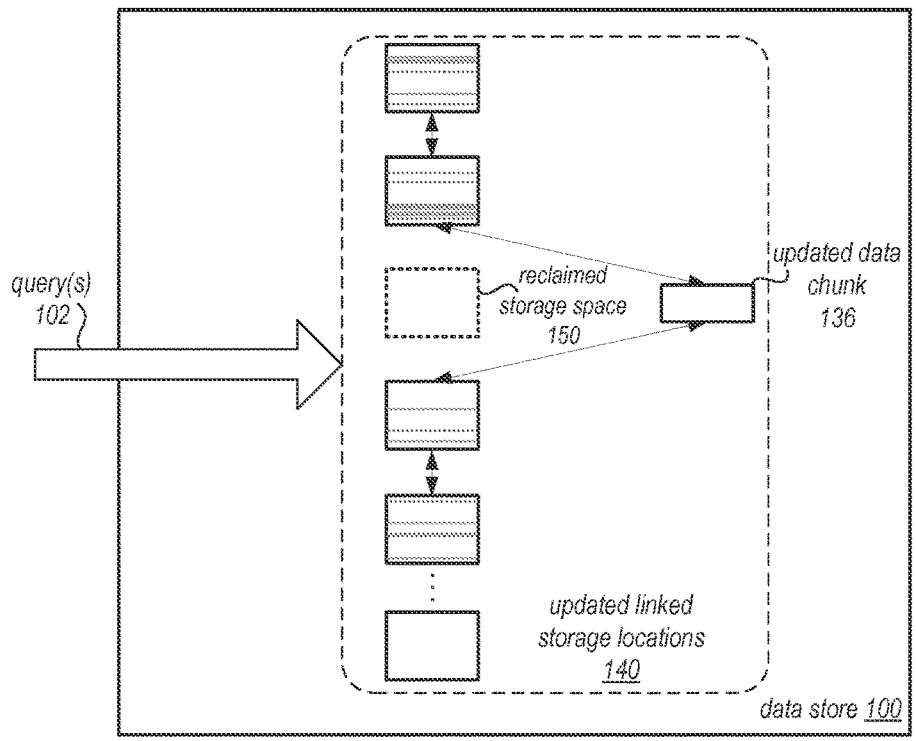

FIGS. 1A and 1B illustrate a series of block diagrams implementing incremental out-of-place updates to datasets for data stores, according to some embodiments. In FIG. 1A, data store 100 may maintain a dataset across multiple different storage locations. These storage locations may include data blocks at one or more block-based persistent storage devices (e.g., hard disk drives or solid state drives), in various embodiments. The storage locations may be linked 110 according to an ordering schema for servicing queries 102 directed toward the dataset. For example data records in a database table may be stored in data blocks sorted according to a sort key, which may be a primary key or other column of the database table. Servicing a query for a range of data records based on the sort key may be performed by scanning or searching the linked storage locations 110 until reaching the end of the range designated by the query. As the data is stored according to the ordering schema, no further storage locations need be accessed to service the query.

As noted above, in various embodiments, updates such as modifications to, insertions of, or deletions from data in a dataset may not be performed in-place. For example, deleted data may be marked as deleted without making the storage space available to store other data. Insertions or modifications to data may be stored in another location, such as unordered storage locations 112 separate from linked storage locations 110. Thus, the accumulation of updates to a dataset may weaken the impact of ordering of the data in the dataset for servicing queries. For instance, as deletions may mark certain portions of a data chunk for deletion 132, these storage locations in the block-based persistent storage may still be accessed or read when servicing query(s) 102, increasing the time to process a query. Similarly, the increase in insertions/modifications stored in the unordered storage locations 112 may require additional searching, which may be less efficient as the storage locations may not be sorted according to the ordering schema.

Figure 6:
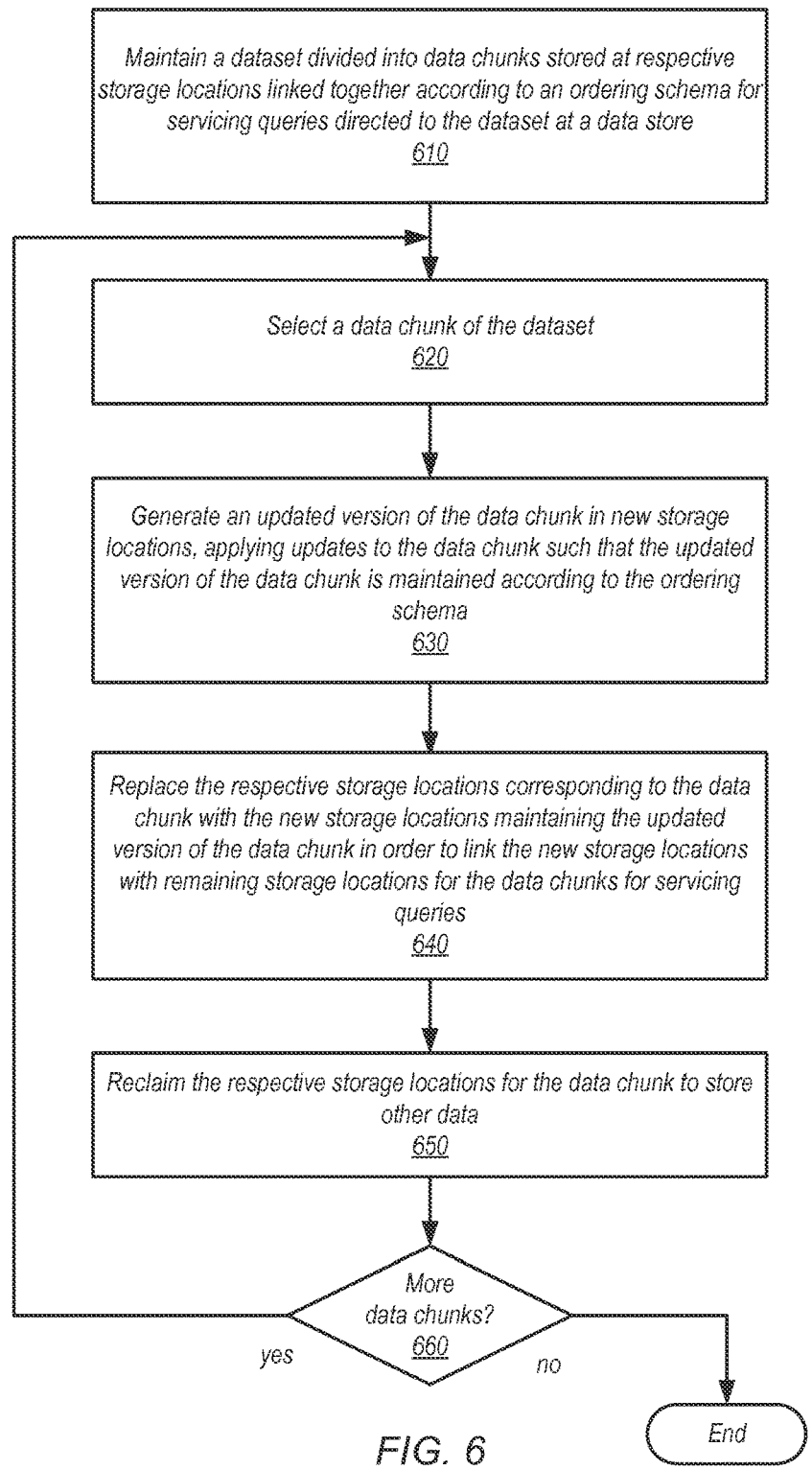
FIG. 6 is a high-level flowchart of methods and techniques to implement incremental out-of-place updates to datasets for data stores, according to some embodiments.
Figure 7:
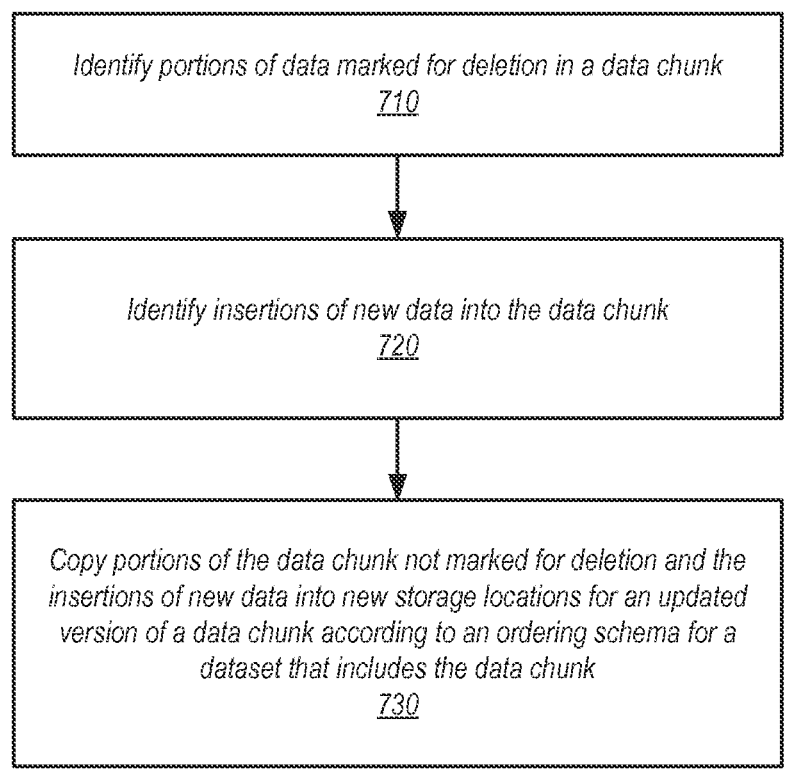
FIG. 7 illustrates a high-level flowchart of a method to generate updated versions of data chunks of a dataset out-of-place, according to some embodiments.

Incremental out-of-place updates may be performed to compact and/or resort data maintained in a dataset, in various embodiments, without blocking the processing of query(s) 102. The dataset may be divided into data chunks 120. An updated version 136 of a data chunk 130 may be generated 130 for each data chunk of data chunks 120. The updated version may be generated in new storage locations that are not included in the linked storage locations. Generating an updated version of the data chunk may include copying data from a data chunk that is not marked 132 for deletion, as well as retrieving data that is inserted/modified from unordered storage locations 112. FIGS. 6 and 7 discussed below provide further detail for incrementally updating the data chunks 120 of a dataset.

As FIG. 1B illustrates, once the generated version of the updated data chunk 136 is complete, the new storage locations may be added to create an updated set of linked storage locations (e.g., by updating a data block chain or mapping information). When query(s) 102 are received, the linked storage locations 140 will direct queries to scan or search the new storage locations of updated data chunk 136 (which may be sorted to include new/modified data, and may be more compact), increasing the efficiency of processing the query 102. Moreover, the reclaimed storage space 150 may be released to store other data. The update of the dataset to compact and/or sort the data in the dataset may be performed incrementally for individual data chunks. In the event of system failure or a pause in the updating of a dataset, the update operation may be able to resume starting at the next data chunk that has not completed updating. Moreover, as query(s) 102 are not blocked during the generation of updated versions of data blocks, the update operation may be performed as part of a background process.

Please note that the previous description of a data store, set of storage locations, and other illustrated components are a logical illustration and thus are not to be construed as limiting as to the implementation of a data store that performs incremental out-of-place updates to datasets.

This specification begins with a general description of a data warehouse service that implements incremental out-of-place updates to datasets. Then various examples of data warehouse, including different components/modules, or arrangements of components/module that may be employed as part of implementing the storage service are discussed. A number of different methods and techniques to implement incremental out-of-place updates to datasets of a data store are then discussed, some of which are illustrated in accompanying flowcharts. Finally, a description of an example computing system upon which the various components, modules, systems, devices, and/or nodes may be implemented is provided. Various examples are provided throughout the specification.

It is not uncommon for clients (or customers, organizations, entities, etc.) to collect large amounts of data which may require subsequent storage or management. Although some clients may wish to implement their own data management system for this data, it is increasingly apparent that obtaining data management services may prove a more efficient and cost effective option for those clients who do not wish to manage their own data. For example, a small business may wish to maintain sales records and related data for future data analysis. Instead of investing directly in the data management system to maintain the data, and the expertise required to set up and maintain the system, the small business may alternatively find it more efficient to contract with a data management service to store and manage their data.

A data management service, such as a data warehouse service discussed below with regard to FIGS. 2 through 5, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as related to implementing incremental out-of-place updates to data stores may be equally configured or adapted to implement embodiments for various other types of database systems, such as row-oriented database systems. Therefore, the following examples are not intended to be limiting as to various other types or formats of database systems. Similar techniques may also be implemented for other types of storage systems, whether structured or semi-structured which may not be implemented as a data warehouse.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data). For example, for database operations that only need to access and/or operate on one or a small number of columns at a time, less memory space may be required than with traditional row-based storage, since only data blocks storing data in the particular columns that are actually needed to execute a query may be retrieved and stored in memory. To increase the efficiency of implementing a columnar relational database table, a multi-column index may be generated to indicate the data values likely stored in data blocks storing data for the indexing columns of a columnar relational database table, which may be used to determine data blocks that do not need to be read when responding to a query.

Figure 2:
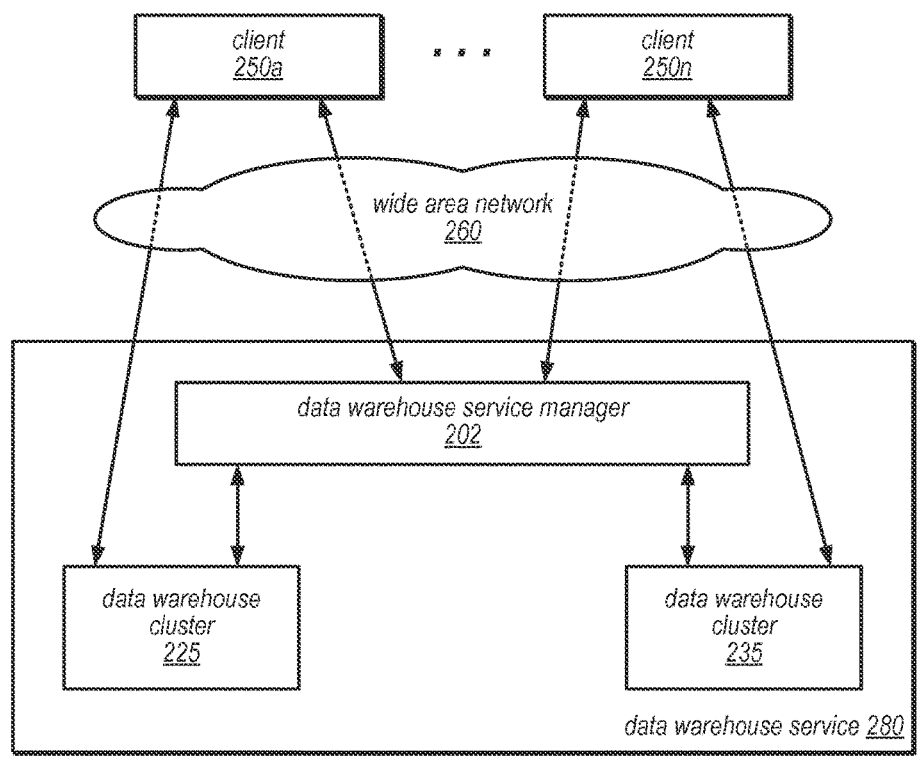
FIG. 2 is a block diagram illustrating an example distributed data warehouse service that implements incremental out-of-place updates to datasets, according to some embodiments.

As discussed above, various clients (or customers, organizations, entities, or users) may wish to store and manage data using a data management service. FIG. 2 illustrates an example distributed data warehouse system that may provide data management services to clients, according to some embodiments. Specifically, distributed data warehouse clusters may respond to store requests (e.g., to write data into storage) or queries for data (e.g., such as a Server Query Language request (SQL) for select data), along with many other data management or storage services.

Multiple users or clients may access a distributed data warehouse cluster to obtain data warehouse services. Clients which may include users, client applications, and/or data warehouse service subscribers), according to some embodiments. In this example, each of the clients 250a through 250n is able to access distributed data warehouse cluster 225 and 235 respectively in the distributed data warehouse service 280. Distributed data warehouse cluster 225 and 235 may include two or more nodes on which data may be stored on behalf of the clients 250a through 250n who have access to those clusters.

A client, such as clients 250a through 250n, may communicate with a data warehouse cluster 225 or 235 via a desktop computer, laptop computer, tablet computer, personal digital assistant, mobile device, server, or any other computing system or other device, such as computer system 1000 described below with regard to FIG. 8, configured to send requests to the distributed data warehouse clusters 225 and 235, and/or receive responses from the distributed data warehouse clusters 225 and 235. Requests, for example may be formatted as a message that includes parameters and/or data associated with a particular function or service offered by a data warehouse cluster. Such a message may be formatted according to a particular markup language such as Extensible Markup Language (XML), and/or may be encapsulated using a protocol such as Simple Object Access Protocol (SOAP). Application programmer interfaces (APIs) may be implemented to provide standardized message formats for clients, such as for when clients are communicating with distributed data warehouse service manager 202.

Clients 250a through 250n may communicate with distributed data warehouse clusters 225 and 235, hosted by distributed data warehouse service 280 using a variety of different communication methods, such as over Wide Area Network (WAN) 260 (e.g., the Internet). Private networks, intranets, and other forms of communication networks may also facilitate communication between clients and distributed data warehouse clusters. A client may assemble a message including a request and convey the message to a network endpoint (e.g., a Uniform Resource Locator (URL)) corresponding to the data warehouse cluster). For example, a client 250a may communicate via a desktop computer running a local software application, such as a web-client, that is configured to send hypertext transfer protocol (HTTP) requests to distributed data warehouse cluster 225 over WAN 260. Responses or other data sent to clients may be formatted in similar ways.

In at least some embodiments, a distributed data warehouse service, as indicated at 280, may host distributed data warehouse clusters, such as clusters 225 and 235. The distributed data warehouse service 280 may provide network endpoints to the clients 250a to 250n of the clusters which allow the clients 250a through 250n to send requests and other messages directly to a particular cluster. As noted above, network endpoints, for example may be a particular network address, such as a URL, which points to a particular cluster. For example, client 250a may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Distributed data warehouse clusters, such as data warehouse cluster 225 and 235, may be made up of one or more nodes. These clusters may include different numbers of nodes. A node may be a server, desktop computer, laptop, or, more generally any other computing device, such as those described below with regard to computer system 1000 in FIG. 8. In some embodiments, the number of nodes in a data warehouse cluster may be modified, such as by a cluster scaling request. Nodes of a data warehouse cluster may implement one or more data slices for storing data. These data slices may be part of storage devices, such as the disk storage devices discussed below with regard to FIGS. 3 and 4. Clusters may be configured to receive requests and other communications over WAN 260 from clients, such as clients 250a through 250n. A cluster may be configured to receive requests from multiple clients via the network endpoint of the cluster.

In some embodiments, distributed data warehouse service 280 may be implemented as part of a network-based service that allows users to set up, operate, and scale a data warehouse in a cloud computing environment. The data warehouse clusters hosted by the network-based service may provide an enterprise-class database query and management system that allows users to scale the clusters, such as by sending a cluster scaling request to a cluster control interface implemented by the network-based service. Scaling clusters may allow users of the network-based service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

In various embodiments, distributed data warehouse service 280 may provide clients (e.g., subscribers to the data warehouse service provided by the distributed data warehouse system) with data storage and management resources that may be created, configured, managed, scaled, and terminated in response to requests from the storage client. For example, in some embodiments, distributed data warehouse service 280 may provide clients of the system with distributed data warehouse clusters composed of virtual compute nodes. These virtual compute nodes may be nodes implemented by virtual machines, such as hardware virtual machines, or other forms of software implemented to simulate hardware configurations. Virtual nodes may be configured to perform the same tasks, functions, and/or services as nodes implemented on physical hardware.

Distributed data warehouse service 280 may be implemented by a large collection of computing devices, such as customized or off-the-shelf computing systems, servers, or any other combination of computing systems or devices, such as the various types of devices described below with regard to FIG. 8. Different subsets of these computing devices may be controlled by distributed data warehouse service manager 202. Distributed data warehouse service manager 202, for example, may provide a cluster control interface to clients, such as clients 250*a* through 250*n*, or any other clients or users who wish to interact with the data warehouse clusters managed by the distributed data warehouse manager 202, which in this example illustration would be distributed data warehouse clusters 225 and 235. For example, distributed data warehouse service manager 202 may generate one or more graphical user interfaces (GUIs) for storage clients, which may then be utilized to select various control functions offered by the control interface for the distributed data warehouse clusters hosted in the distributed data warehouse service 280.

Figure 3:
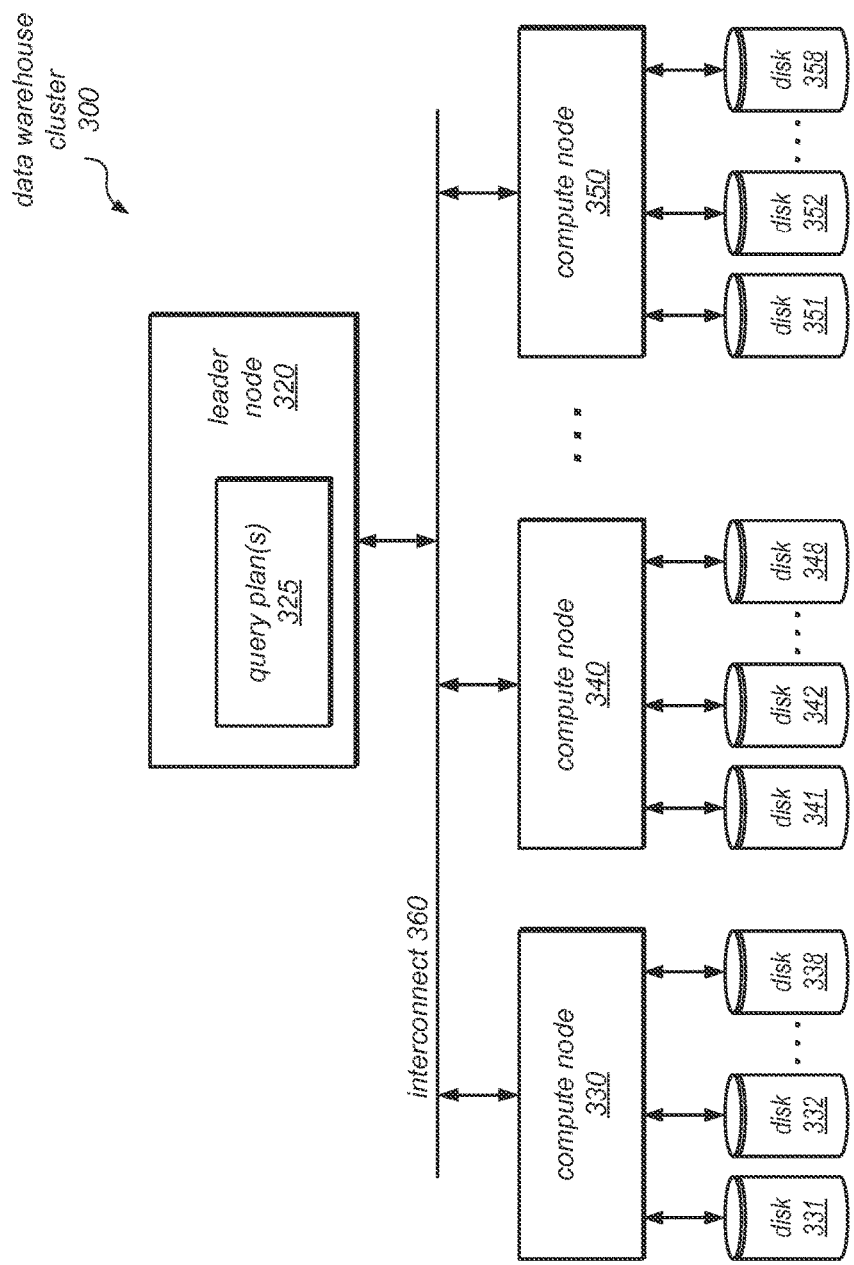
FIG. 3 is a block diagram illustrating an example distributed data warehouse cluster, according to some embodiments.

FIG. 3 is a block diagram illustrating a distributed data warehouse cluster in a distributed data warehouse service, according to one embodiment. As illustrated in this example, a distributed data warehouse cluster 300 may include a leader node 320 and compute nodes 330, 340, and 350, which may communicate with each other over an interconnect 360. Leader node 320 may generate and/or maintain one or more query plans 325 for executing queries on distributed data warehouse cluster 300. As described herein, each node in a distributed data warehouse cluster may include multiple disks on which data blocks may be stored on behalf of clients (e.g., users, client applications, and/or distributed data warehouse service subscribers). In this example, compute node 330 includes disks 331-338, compute node 340 includes disks 341-348, and compute node 350 includes disks 351-358. In some embodiments, a component of the distributed data warehouse cluster (or the distributed data warehouse system of which it is a component) may support load balancing, using any of a variety of applicable load balancing techniques. For example, in some embodiments, leader node 320 may include a load balancing component (not shown).

In at least some embodiments, distributed data warehouse cluster 300 may be implemented as part of the web based data warehousing service, such as the one described above, and includes a leader node 320 and multiple compute nodes, such as compute nodes 330, 340, and 350. The leader node 320 may manage communications with storage clients, such as clients 250*a* through 250*n* discussed above with regard to FIG. 2. For example, a leader node may be a server that receives requests from various client programs (e.g., applications) and/or subscribers (users), then parses them and develops an execution plan (e.g., query plan(s) 325) to carry out the associated database operation(s). More specifically, the leader node may develop the series of steps necessary to obtain results for complex queries and joins. Leader node 320 may also manage the communications among compute nodes 330 through 350 instructed to carry out database operations for data stored in the distributed data warehousing cluster 300. For example, compiled code may be distributed by leader node 320 to various ones of the compute nodes 330 to 350 to carry out the steps needed to perform queries, and intermediate results of those queries may be sent back to the leader node 320. Leader node 320 may receive data and query responses or results from compute nodes 330, 340, and 350. A database schema and/or other metadata information for the data stored among the compute nodes, such as the data tables stored in the cluster, may be managed and stored by leader node 320.

Distributed data warehousing cluster 300 may also include compute nodes, such as compute nodes 330, 340, and 350. These one or more compute nodes (sometimes referred to as storage nodes), may for example, be implemented on servers or other computing devices, such as those described below with regard to computer system 1000 in FIG. 8, and each may include individual query processing "slices" defined, for example, for each core of a server's multi-core processor. Compute nodes may perform processing of database operations, such as queries, based on instructions sent to compute nodes 330, 340, and 350 from leader node 320. The instructions may, for example, be compiled code from execution plan segments and steps that are executable by the particular data compute node to which it is sent. Data compute nodes may send intermediate results from queries back to leader node 320 for final aggregation. Each data compute node may be configured to access a certain memory and disk space in order to process a portion of the workload for a query (or other database operation) that is sent to one or more of the compute nodes 330, 340 or 350. Thus, compute node 330, for example, may access disk 431, 432, up until disk 438.

Disks, such as the disks 331 through 358 illustrated in FIG. 3, may be may be implemented as one or more of any type of storage devices and/or storage system suitable for storing data accessible to the data compute nodes, including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store columnar database tables through various column-oriented database schemes.

In some embodiments, each of the compute nodes in a distributed data warehouse cluster may implement a set of processes running on the node server's (or other computing device's) operating system that manage communication with the leader node, e.g., to receive commands, send back data, and route compiled code to individual query processes (e.g., for each core or slice on the node) in order to execute a given query. In some embodiments, each of compute nodes includes metadata for the blocks stored on the node. In at least some embodiments this block metadata may be aggregated together into a superblock data structure, which is a data structure (e.g., an array of data) whose entries store information (e.g., metadata about each of the data blocks stored on that node (i.e., one entry per data block). In some embodiments, each entry of the superblock data structure includes a unique ID for a respective block, and that unique ID may be used to perform various operations associated with data block. For example, indications of column-specific compression techniques applied to the data stored in the data block, indications of default compression techniques applied to the data stored in the data block, or probabilistic data structures that indicate data values not stored in a data block may all be stored in the respective entry for a data block. In some embodiments, the unique ID may be generated (and a corresponding entry in the superblock created) by the leader node or by a computing node when the data block is first written in the distributed data warehouse system.

Figure 4:
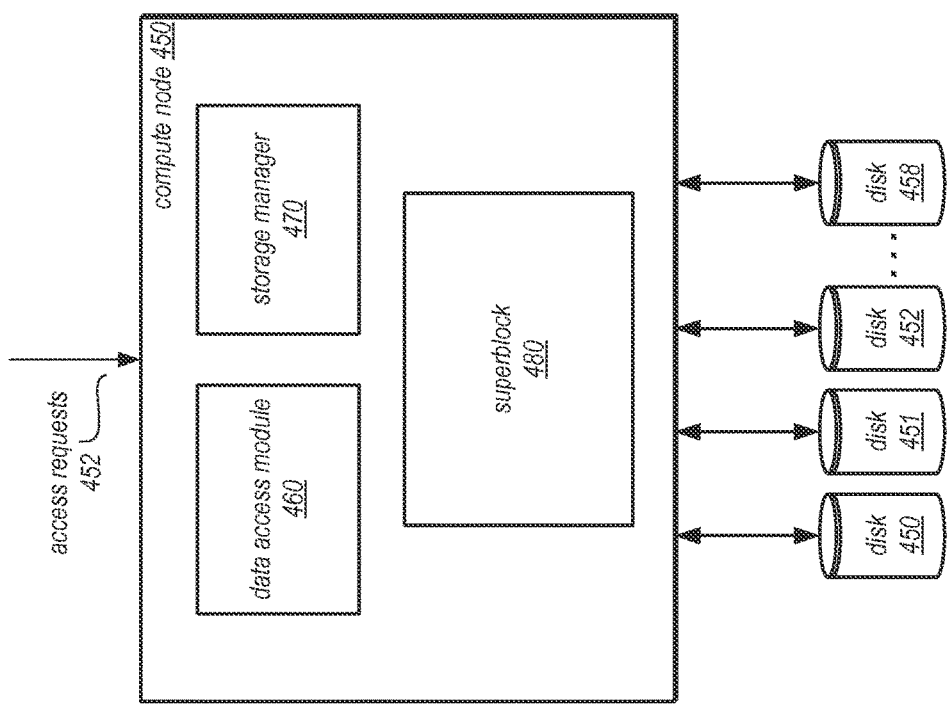
FIG. 4 is a block diagram illustrating an example compute node, according to some embodiments.

FIG. 4 illustrates an example of a compute node, according to some embodiments. Access requests 452, such as the various queries and messages sent to a leader node, such as leader node 320, and sent from a leader node to a compute node, may be received at compute node 450. A data access module 460, such as described in further detail below with regard to FIG. 5, may process access requests, directing reads, writes, and other access operations to disks 450 through 458. A storage manager 470, such as described in more detail below with regard to FIG. 5, may manage the storage of data for different datasets (e.g., database tables), on disks 450 through 458.

In some embodiments, a compute node 450 may also include a superblock data structure 480, such as the superblock data structure described above, stored locally at the compute node or stored remotely, but accessible to the compute node, which may include respective entries for the data blocks stored on the compute node 450 which store block metadata including information indicating the block chain or mapping information describing the ordering schema for data across the data blocks on disks 450 through 458, as well as other information. Note, however, that in some embodiments, metadata for data blocks may be stored in multiple different locations, such as in the data block itself, or in in other individual data structures. Therefore, the superblock data structure 480 is not intended to be limiting as to the various other structures, locations, methods, or techniques which might be applied to preserve metadata information for the data block.

Figure 5:
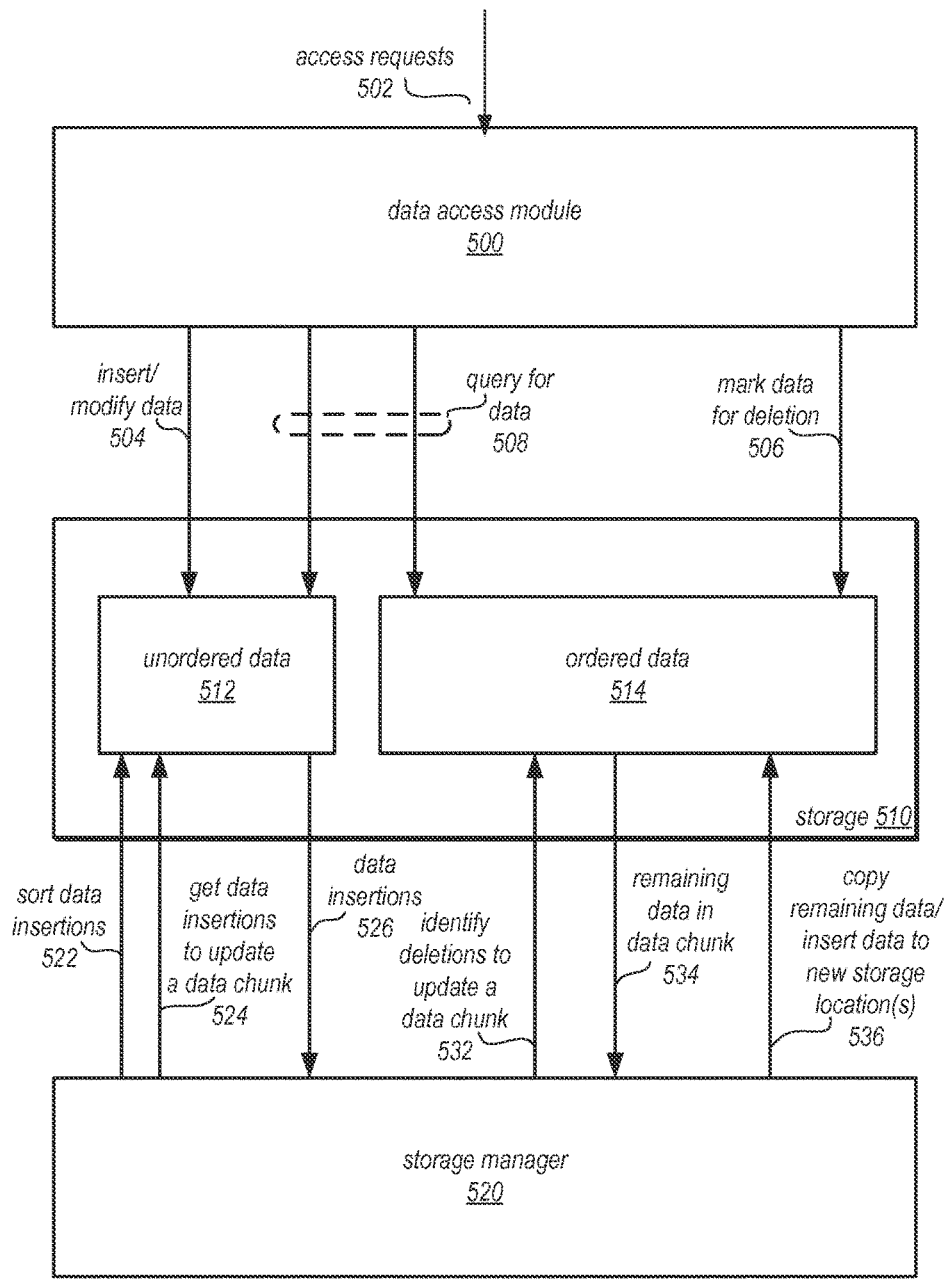
FIG. 5 is a block diagram illustrating interactions between a storage manager, access manager, and data storage that implements incremental out-of-place updates to datasets, according to some embodiments.

As discussed above, a compute node may be configured to receive access requests, such as queries, storage operations, and other data management operations. FIG. 5 is a block diagram illustrating interactions between a storage manager, access manager, and data storage that implements incremental out-of-place updates to datasets, according to some embodiments. Access requests 502 may be received as inputs to data access module 500. Data access module 500 may communicate with storage 510, which may store a plurality of data blocks for multiple columns of a columnar database table. Data access module 500 may be configured to both store this data and read this data from storage in response to access requests. Storage manager 520 may be configured to manage the arrangement or storage of data in storage 510, compacting and/or sorting data in the data blocks according to an ordering schema for the database table.

Portions or all of data access module 500 or storage manager 520 may be implemented on a compute node, such as compute node 450 described above with regard to FIG. 4. Although depicted in as implemented in a compute node in FIG. 4, data access module 500 or storage manager 520 may be implemented in leader node 320, described above with regard to FIG. 3, or some other component or module of the data warehouse service. Various different configurations of hardware and software components may be used to implement the data access module 500 or storage manager 520.

Data access module 500 may receive access requests 502. These access requests 502 may include requests to query for select data, or to update a dataset (e.g., database table), such as by inserting, modifying, or deleting data. Data access module 500 may store inserts and/or modifications 504 in a portion of storage 520 that is unordered data 512. Unordered data 512 may persistently maintain new data that is inserted into a database table as well as modifications to data that is stored as part of ordered data 514 in an unordered manner. For example, as new updates come in, the updates may be appended to the end of the unordered data area 512 (which may be logically mapped to different physical storage locations). A record, copy, or other indication of the update to insert/modify may be maintained, in various embodiments. By persistently storing inserts and modifications into unordered data 512, updates to a dataset may not be made in-place. In at least some embodiments, storage manager 530 may sort 522 unordered data 512 according to the same ordering schema as applied to ordered data 514 (either periodically or aperiodically). For example, if the ordered data is sorted according to a primary or sort key value, then the unordered data 512 may be sorted according to the same primary or sort key value. The sortation 522 may occur in portions or chunks of unordered data, similar to the chunks of the dataset maintained as part of ordered data 514. Update requests to delete data in the dataset may be processed by access request module 500, which may mark the identified portions of data for deletion 506 in ordered data 514.

Storage manager 530 may be configured to perform the various methods and techniques described below with regard to FIGS. 6 and 7. For instance, storage manager 520 may select dataset (e.g., a database table) and a particular data chunk to update. Storage manager 520 may access unordered data 512 to get insertions of new data to update the data chunk 526. Storage manager 520 may also be configured to identify those portions of the data chunk marked for deletion 532 and retrieve the remaining data in the data chunk 534 not marked for deletion. Storage manager 520 may then sort and copy 536 the remaining data and/or insertions of new data into the ordered data 514, replacing the storage locations for the current version of the data chunk with the new storage locations of the updated version of the data chunk to link the updated version of the data chunk to other data chunks in ordered data 514 for servicing queries 508.

Meanwhile, before, during, and after the generation of updated versions of data chunks, query(s) for data may be received at data access module 500. Data access module 500 may access both ordered data 514 and unordered data 512 to service the query 508. If for instance, ordered data 514 returns 4 records that match the query predicate in query 508, unordered data 512 may also be search and return and additional 2 records that match the query predicate which have not yet been inserted into ordered data 514. Thus, data access module 500 may access a block chain or other mapping information which indicates the ordering of storage locations in ordered data 514 to service queries. When the block chain or mapping information is updated as a result of replacing current data chunks with new versions of data chunks (compacting and/or inserting new data into the new versions of the data chunks), then subsequent queries 508 may be serviced using the updated block chain or mapping information to search the new versions of the data chunks.

While FIGS. 2 through 5 have been described and illustrated in the context of a data warehouse service implementing a column-oriented relational database, the various components illustrated and described in FIGS. 2 through 5 may be easily applied to other data management systems that provide data management and/or storage services for a relational database table, which may include various other data formats, such as a row-oriented relational database. As such, FIGS. 2 through 5 are not intended to be limiting embodiments in a data warehouse cluster, nor limiting a description of a data storage and management cluster. Moreover, the data warehouse service is provided as an example of a data store which may implement incremental out-of-place updates for datasets, which may also be implemented for a variety of other different data stores.

FIG. 6 is a high-level flowchart of methods and techniques to implement incremental out-of-place updates to datasets for data stores, according to some embodiments. Various different systems and devices may implement the various methods and techniques described below, either singly or working together. For example, a storage system or node maintaining a dataset for a data store may implement a storage manager, such as storage manager 520 in FIG. 5, that is configured to implement the various methods described below. The data store may be relational, as described above, or may be formatted differently. In various embodiments, any structured or semi-structured data store, such as a non-relational database, may implement incremental out-of-place updates to data sets maintaining data according to an ordering schema. Alternatively, a combination of different systems and devices, such as the multiple compute nodes illustrated in FIG. 3 working together, for example, may also perform the below method and techniques, as well as a leader node 320, also illustrated in FIG. 3. Therefore, the above examples and or any other systems or devices referenced as performing the illustrated method, are not intended to be limiting as to other different components, modules, systems, or configurations of systems and devices.

As indicated at 610, a dataset may be maintained at a relational data store, in some embodiments, that has been divided into different data chunks. These data chunks may correspond to ranges or portions of data within a dataset according to the data model or format of the data store. For example, in some embodiments, the data store may be a column-oriented, relational database as described above, or a non-relational database. The portions of data for each data chunk, such as the rows or fields of a database table located within the range of data, may be located in one or more storage locations. For example, the one or more storage locations may be one or more data blocks of a block-based persistent storage device. The storage locations of a data chunk may be physically or logically mapped to the block-based persistent storage device.

In at least some embodiments, the dataset may be maintained across the respective storage locations for the different data chunks according to an ordering schema for servicing queries. For example, the data within a data chunk (e.g., rows, columns, fields, etc. . . . ) may be sorted according to a primary or index key identified for the dataset. When servicing a query that includes a predicate that is selective based on the primary or index key, then the location of select data that satisfies the predicate of the query may be co-located with similar values in a similar storage location (e.g., within a single or consecutive storage locations). In some embodiments, the data may be physically or logically stored according to the ordering schema. For instance, in a column-oriented relational data store, such as the data warehouse described above with regard to FIGS. 2-5, the fields of a particular column may be stored in physical storage locations (e.g., within data blocks of a block-based persistent storage device) according to the sorted ordering of rows for a database table.

The respective storage locations of the data chunks of the dataset may be linked together according to the respective ordering schema, in various embodiments. Mapping information, or other metadata, may indicate the ordering between storage locations that make up the data chunks of the dataset. For example, mapping information may indicate that a first data chunk of rows 1-3,000 may be divided up into data blocks 1, 2, and 3 (containing rows 1-1,000, 1,001-2,000, and 2,001-3,000 respectively), whereas the second data chunk containing rows 3,001-6,000 may be divided up into data blocks 4, 5, and 6 (containing rows 3,001-4,000, 4,001-5,000, and 5,001-6,000 respectively). Thus the mapping information may indicate that the ordering or linking of data blocks in this example is data block 1→2→3→4→5→6.

In various embodiments, updates (e.g., changes, modifications, insertions, or deletions) to portions of the dataset may not occur in place. For example, as update requests are received for the dataset, the update requests may be stored in an unordered buffer or storage area. An insertion of new data (e.g., a new row in a database table) may be stored in a storage area that maintains the new data separate from the rest of the dataset (e.g., in different storage locations). Similarly a change or modification of a portion of data in the dataset may also be stored in the unordered storage area. For deletion requests, the portion of data to be deleted may be marked (e.g., a flag or other identifier) in the storage area (or in mapping information or other metadata) to indicate that the portion of data is deleted, and not to be considered when servicing a query.

Over time out-of-place updates for the dataset may cause or increase inefficient searching or scanning for select data. Consider the scenario where a large number of changes to data in the dataset or insertions of new data to the dataset have been received and stored in the unordered storage area. In addition to searching the data of the dataset stored in the ordered portions of the dataset within the data chunks for servicing a query, the unordered storage area may also have to be searched to determine if any changes or additional data satisfy the query. In another example, as the number of deleted portions of a dataset grows, the number of marked for deletion portions of data in the data chunks may be searched, even though the marked portions may not be considered for a query. Incremental out-of-place updates may be performed to generate updated versions of the data chunks, which may be more efficient for searching/evaluating when servicing queries as the data chunks may become again ordered for servicing queries according to the ordering scheme as a result of compacting and sorting data in the data chunk.

Incremental updates to a dataset may be performed on a per data chunk basis. For those data chunks that are not yet updated, the data chunk may still be available to service queries. Moreover, once a particular data chunk is updated, the updated version of the data chunk may be included along with other data chunks (which may or may not be updated for servicing queries). As indicated at 620, a data chunk of the dataset may be selected, in various embodiments. For instance, the update of data chunks may proceed according to the ordering schema. If the range of data included in a particular data chunk is the next range of data according to the ordering schema (e.g., if data chunks containing rows 1-10,000 have been updated, then the data chunk containing rows 10,001-12,000) may be selected. In some embodiments, the selected data chunk may be identified which includes the most updates (e.g., deletions or insertions).

As the updates to the data chunks may be performed incrementally, the update to the dataset may be restarted after a pause, failure, or other halt of the update without a loss of progress in updating the dataset. For example, if a system failure or crash causes a storage system maintaining the dataset to restart, the performance of the update to the dataset may be restarted at the next data chunk for which an updated version has not yet been generated. Metadata or other tracking information for the update of the dataset may be maintained which tracks which data chunks in a dataset have been updated and which data chunks have not been updated. Thus, in some embodiments, the data chunk selected, as indicated at 610, may be selected upon a restart of updating the dataset.

As indicated at 630, an updated version of the selected data chunk may be generated in new storage locations, in various embodiments. Generating the update may include applying updates to the data chunk. Updates, as discussed above, may be inserts, changes, modifications and/or deletions to the dataset. New rows, for example, may be inserted into the data chunk, while rows marked for deletion may not be included in the updated version. As discussed in further detail below with regard to FIG. 7, the updated version of the data chunk may be generated such that the data chunk is maintained within the new storage locations according to the ordering schema, in various embodiments. Thus if the data within a data chunk is sorted according to a particular value in a particular column, for instance, then the updated version may also be stored according to that same value. Consequently an updated version of a data chunk may be a compacted and/or resorted version of the data chunk that includes modified or inserted data (which is sometimes referred to as a vacuum process).

The new storage locations may be storage locations that are not identified as or included in the set of storage locations linked together. Consider an example where data blocks 13,001, 13,002, 13,003, . . . 13,020, store data for data in a dataset divided up into different data chunks. Suppose a data chunk of the dataset corresponding to data blocks 13,011-13,013 was selected and an updated version generated. The updated version may be generated in data blocks 12,001 and 12,002, which are not included in the original set of data blocks linked together to maintain the dataset. These data blocks, 12,001 and 12,002, may be out-of-place (or out-of-band) from the other data blocks linked together for the dataset (data blocks 13,001-13,010).

Once the updated version of the data chunk is generated, then the respective storage locations corresponding to the data chunk may be replaced with the new storage locations of the updated version of the data chunk, as indicated at 640 in various embodiments, in order to link the new storage locations with remaining storage locations for the data chunks of the dataset for servicing queries. For example, as noted earlier, a block chain or other set of mapping information or metadata may describe the storage locations (and an ordering of storage locations) that maintain the data chunks of the dataset. Thus, the portion of the block chain or metadata identifying the selected data chunk's respective storage locations may be updated to identify the new storage locations for the updated version of the data chunk.

Query servicing during the generation of the updated version of the data block may still access the prior version of the data chunk until the new storage locations of the updated version of the data chunk replace the storage locations for the prior version of the data chunk. Thus, the compaction and/or sortation involved for applying updates to the dataset may not block access to the dataset for current queries (as the same results may be determined for the queries based on searching the ordered storage locations and the unordered storage locations). Queries subsequent to the replacement of the data chunk with the updated version of the data chunk may access the updated version of the data chunk in order to service the query. In at least some embodiments, after updates stored in the unordered storage area are applied to generate a new version of the data chunk and the new storage locations are linked together with the other storage locations of the other data chunks to replace the respective storage locations for the data chunk, then the updates may be removed or deleted from the unordered storage area.

As indicated at 650, the respective storage locations for the data chunk may then be reclaimed to store other data. For example, the storage locations may be de-allocated or returned to an operating system for other system persistent storage needs. In some embodiments, whether the block-based persistent storage device is implemented as part of a multi-tenant storage system, the reclaimed storage locations may be utilized to store data for another client, system, or device.

As indicated at 660, elements 620 through 650 may be repeated multiple times until no more data chunks remain to be updated, in various embodiments. For instance, every data chunk may have been updated (or every data chunk to which received updates pertain to have been updated). In some embodiments, only select data chunks of a dataset may be updated (e.g., those that involve a large number of updates), while data chunks with a small number of updates may not be updated.

In at least some embodiments, multiple datasets may be maintained in the data store. For example, one dataset may store information about sales, one dataset may store information about purchasers, and one dataset may store information about inventory. A particular one of the multiple datasets may be selected for update, in some embodiments. For example, in at least some embodiments, input/output (I/O) efficiency may be determined for a particular dataset. The latency or wait time to perform queries upon a particular dataset, for instance, may be tracked for each dataset. The dataset with the lowest I/O efficiency may be the dataset selected for update. Other selection schemes or techniques may be implemented. For example, the dataset that is currently experiencing the least number of queries/other access requests may be selected, in some embodiments. In some embodiments, an update event may trigger the performance of an update to a particular dataset. For example, the I/O efficiency measurement for the table may fall below a particular threshold.

As noted earlier, queries directed toward the dataset may still be serviced while updated versions of data chunks are generated out-of-place. These queries may be serviced as part of a foreground process. Meanwhile, in at least some embodiments, the various techniques described above to implement incremental out-of-place updates may be performed as a part of a background process. The background process may be paused and/or restarted (e.g., in the event of a pause or system failure), allowing the updating of the data chunks in a dataset to continue incrementally. The background process may automatically or dynamically continue working to update data chunks for a dataset at optimal times (e.g., when foreground processing activity is below a certain threshold).

Generating an updated version of a dataset may be performed in various ways. FIG. 7 illustrates a high-level flowchart of a method to generate updated versions of data chunks of a dataset out-of-place, according to some embodiments. The updated version of a data chunk may be a different size (e.g., more or less new storage locations) that the current respective storage locations for the data chunk. If, for instance, a large number of deletion updates have been marked within the data chunk then the updated data chunk may be smaller. Conversely, large amounts of new data inserted into the data chunk may cause the size of the data chunk to increase.

As indicated at 710, portions of the data within the data chunk marked for deletion may be identified, in some embodiments. For example, a header or other set of metadata for each portion of data (e.g., a row of data in a database table or a field of data pertaining to particular column) may include a field, value, or bit that indicates whether or not the portion of data is to be included for servicing a query.

As indicated at 720, insertions of new data into the data chunk may be identified. For example, the unordered area which may maintain the updates to insert new data may be searched or scanned to identify new data which fits within or is adjacent to data within the data chunk. In at least some embodiments, the unordered storage area may be sorted according to the ordering schema (which may decrease the amount of time spent servicing queries and/or identify updates to include in the generation of an updated version of a data chunk). Please note that similar techniques may be applied for changes to or modifications of portions of data in the data chunk.

As indicated at 730, portions of the data chunk not identified as marked for deletion may be copied from the current respective storage locations into new storage locations for the updated version of the data chunk according to the ordering scheme for the dataset. In addition to copying portions of data not marked for deletion from the current respective storage locations, insertions of new data may also be copied into the updated version of the data chunk in the new storage locations. Both the remaining data and the new data may be sorted according to the ordering schema and compacted such that storage space for deleted portions of the data chunk is not included in the updated version of the data chunk.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of incremental out-of-place updates to datasets for data stores as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s).

Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 8:
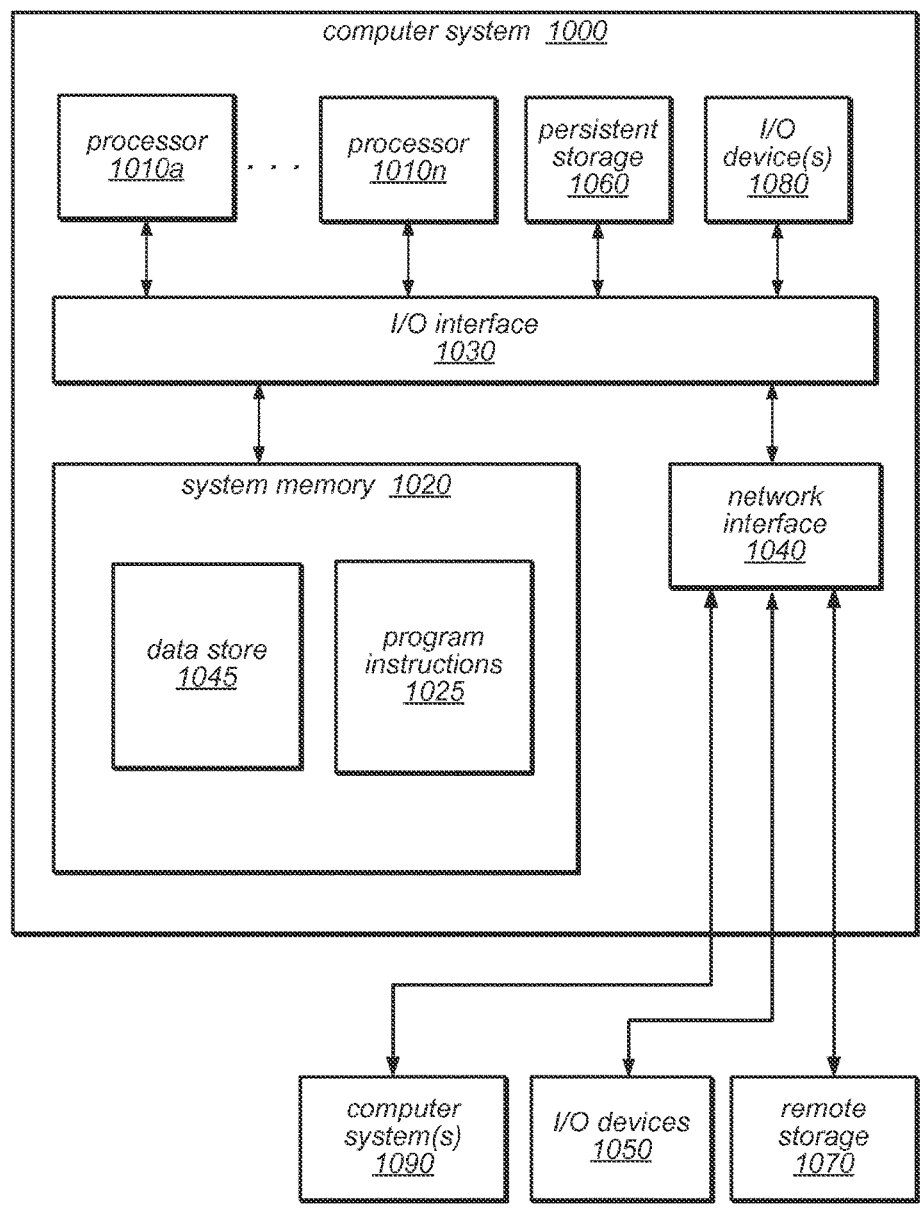
FIG. 8 illustrates an example system configured to implement the various methods, techniques, and systems described herein, according to some embodiments.

As shown in FIG. 8, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the figures. Data storage 1035 may include data that may be used in embodiments. In other embodiments, other or different software elements and data may be included.

Those skilled in the art will appreciate that computer system 1000 is merely illustrative and is not intended to limit the scope of the stereo drawing techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more block-based persistent storage devices, configured to maintain a plurality of data chunks that together comprise a dataset as part of a relational data store, wherein individual ones of the plurality of data chunks correspond to a respective one or more storage locations at the one or more block-based persistent storage devices, wherein the respective storage locations for the plurality of data chunks are linked together according to an ordering schema that specifies a sort order according to a data value of the dataset such that data of the dataset for the relational data store is stored across the respective linked storage locations according to the sort order of the ordering schema for servicing queries;
at least one processor;
a memory, comprising program instructions that when executed cause the at least one processor to implement a storage manager;

the storage manager, configured to:
for individual ones of the plurality of data chunks:
generate an updated version of the data chunk in one or more new storage locations at the block-based persistent storage device that are not included among the respective storage locations for the plurality of data chunks, wherein the generation of the updated version of the data chunk applies at least one data value insertion or deletion to the data chunk such that data of the updated version of the data chunk is stored within the one or more new storage locations according to the sort order of the ordering schema, wherein the plurality of data chunks including the data chunk are available to service queries during the generation of the updated version of the data chunk;
in response to the generation of the updated version of the data chunk:
replace the respective one or more storage locations corresponding to the data chunk with the one or more new storage locations storing the updated version of the data chunk in order to link the one or more new storage locations together in the sort order with remaining ones of the respective storage locations for the plurality of data chunks, wherein subsequent queries are serviced from the plurality of data chunks including the updated version of the data chunk; and
reclaim the respective one or more storage locations for the data chunk to store other data.

2. The system of claim 1, wherein the dataset is one of a plurality of datasets maintained as part of the relational data store, and wherein the storage manager is further configured to:
prior to the generation, the replacement, and the reclamation, identify the dataset of the plurality of datasets to update.

3. The system of claim 1,
wherein updates for the dataset are not performed in place, wherein the at least one update comprises a plurality of requests to delete respective portions of the data chunk;
wherein to apply the at least one update to the data chunk the storage manager is configured to identify the respective portions of the data chunk to delete; and
wherein to generate the updated version of the data chunk the storage manager is further configured to copy remaining portions of the data chunk not identified for deletion into the one or more new storage locations such that storage space for the respective portions of the data chunk identified for deletion are not included in the one or more new storage locations.

4. The system of claim 1, wherein the relational data store is implemented as a network-based data warehouse service, wherein the dataset is maintained for a client of a plurality of clients of the network-based data warehouse, wherein the one or more block-based persistent storage devices are multi-tenant such that another dataset for another client of the plurality of clients is maintained across the one or more block-based storage devices.

5. A method, comprising:
performing, by one or more computing devices:
selecting a data chunk of a plurality of data chunks that together comprise a dataset maintained as part of a data store, wherein individual ones of the plurality of data chunks correspond to a respective one or more storage locations at a block-based persistent storage device, wherein the respective storage locations for the plurality of data chunks are linked together according to an ordering schema that specifies a sort order according to a data value of the dataset such that data of the dataset for the data store is stored across the respective linked storage locations according to the sort order of the ordering schema for servicing queries;

generating an updated version of the data chunk in one or more new storage locations at the block-based persistent storage device that are not included among the respective storage locations for the plurality of data chunks, wherein generating the updated version of the data chunk comprises applying at least one data value insertion or deletion to the data chunk such that data of the updated version of the data chunk is stored within the one or more new storage locations according to the sort order of the ordering schema, wherein the plurality of data chunks including the selected data chunk are available to service queries during the generation of the updated version of the data chunk;

in response to generating the updated version of the data chunk:
replacing the respective one or more storage locations corresponding to the selected data chunk with the one or more new storage locations storing the updated version of the data chunk in order to link the one or more new storage locations together in the sort order with remaining ones of the respective storage locations for the plurality of data chunks, wherein subsequent queries are serviced from the plurality of data chunks including the updated version of the data chunk; and reclaiming the respective one or more storage locations for the selected data chunk to store other data.

6. The method of claim 5, wherein the dataset is one of a plurality of datasets maintained as part of the data store, and wherein the method further comprises:
prior to the selecting, the generating, the replacing, and the reclaiming, identifying the dataset of the plurality of datasets to update.

7. The method of claim 6, wherein identifying the dataset of the plurality of datasets for update is based, at least in part, on input/output (I/O) efficiency for servicing queries directed toward the dataset.

8. The method of claim 5,
wherein updates for the dataset are not performed in place, wherein the at least one update comprises a plurality of requests to delete respective portions of the data chunk;
wherein applying the at least one update to the data chunk comprises identifying the respective portions of the data chunk to delete; and
wherein generating the updated version of the data chunk further comprises copying remaining portions of the data chunk not identified for deletion into the one or more new storage locations such that storage space for the respective portions of the data chunk identified for deletion are not included in the one or more new storage locations.

9. The method of claim 8, wherein the one or more new storage locations are less than the respective one or more storage locations such that a size of the updated version of the data chunk is less than a size of the selected data chunk.

10. The method of claim 5,
wherein updates for the dataset are not performed in place, wherein the at least one update comprises one or more requests to insert new data portions into the data chunk; and
wherein applying the at least one update to the data chunk comprises inserting the one or more new portions of the data chunk into the one or more new storage locations according to the ordering schema.

11. The method of claim 5, wherein the selecting, the generating, the replacing, and the reclaiming are automatically performed as part of background processing, and wherein servicing queries directed toward the dataset is performed as part of foreground processing.

12. The method of claim 5, wherein the selecting, the generating, the replacing, and the reclaiming are performed incrementally for individual ones of the plurality of data chunks of the dataset.

13. The method of claim 5, wherein selecting the data chunk of the plurality of data chunks comprises identifying a remaining data chunk to be updated of the plurality of data chunks subsequent to a restart, wherein the selecting, the generating, the replacing, and the reclaiming were performed for at least one or more other data chunks of the plurality of data chunks prior to the restart.

14. A non-transitory, computer-readable storage medium, storing program instructions that when executed by one or more computing devices cause the one or more computing devices to implement:
maintaining a plurality of data chunks that together comprise a dataset as part of a data store, wherein individual ones of the plurality of data chunks correspond to a respective one or more storage locations at a block-based persistent storage device, wherein the respective storage locations for the plurality of data chunks are linked together according to an ordering schema that specifies a sort order according to a data value of the dataset such that data of the dataset for the data store is stored across the respective linked storage locations according to the sort order of the ordering schema for servicing queries;

for individual ones of the plurality of data chunks:
generating an updated version of the data chunk in one or more new storage locations at the block-based persistent storage device that are not included among the respective storage locations for the plurality of data chunks, wherein generating the updated version of the data chunk comprises applying at least one data value insertion or deletion to the data chunk such that data of the updated version of the data chunk is stored within the one or more new storage locations according to the sort order of the ordering schema, wherein the plurality of data chunks including the data chunk are available to service queries during the generation of the updated version of the data chunk;

in response to generating the updated version of the data chunk:
replacing the respective one or more storage locations corresponding to the data chunk with the one or more new storage locations storing the updated version of the data chunk in order to link the one or more new storage locations together in the sort order with remaining ones of the respective storage locations for the plurality of data chunks, wherein subsequent queries are serviced from the plurality of data chunks including the updated version of the data chunk; and reclaiming the respective one or more storage locations for the data chunk to store other data.

15. The non-transitory, computer-readable storage medium of claim 14, wherein the generating, the replacing, and the reclaiming for the individual ones of the plurality of data chunks are performed in response to detecting an update event for the dataset.

16. The non-transitory, computer-readable storage medium of claim 14,
- wherein updates for the dataset are not performed in place, wherein the at least one update comprises a plurality of requests to delete respective portions of the data chunk;
- wherein, in applying the at least one update to the data chunk, the program instructions cause the one or more computing devices to implement identifying the respective portions of the data chunk to delete; and
- wherein, in generating the updated version of the data chunk, the program instructions cause the one or more computing devices to further implement copying remaining portions of the data chunk not identified for deletion into the one or more new storage locations such that storage space for the respective portions of the data chunk identified for deletion are not included in the one or more new storage locations.

17. The non-transitory, computer-readable storage medium of claim 14,
- wherein updates for the dataset are not performed in place, wherein the at least one update comprises one or more requests to insert new data portions into the data chunk; and
- wherein, in applying the at least one update to the data chunk, the program instructions cause the one or more computing devices to further implement inserting the one or more new portions of the data chunk into the one or more new storage locations according to the ordering schema.

18. The non-transitory, computer-readable storage medium of claim 17,
- wherein the one or more requests to insert new portions of data into the data chunk are maintained along with a larger collection of requests to insert new portions of data into the dataset in other storage locations different than the respective storage locations for the plurality of data chunks;
- wherein, the program instructions cause the one or more computing devices to implement sorting the larger collection of requests to insert new portions of data into the dataset according to the ordering schema; and
- wherein, in applying the at least one update to the data chunk, the program instructions cause the one or more computing devices to further implement obtaining the one or more requests to insert new portions of data into the data chunk from the sorted larger collection of requests in the other storage locations.

19. The non-transitory, computer-readable storage medium of claim 14, wherein the selecting, the generating, the replacing, and the reclaiming are automatically performed as part of background processing, and wherein servicing queries directed toward the dataset is performed as part of foreground processing.

20. The non-transitory, computer-readable storage medium of claim 14, wherein the data store is implemented as part of a multi-tenant, network-based storage service.

* * * * *